United States Patent [19]

Schmidt

[11] Patent Number: 5,072,372

[45] Date of Patent: Dec. 10, 1991

[54] INDIRECT LITERAL EXPANSION FOR COMPUTER INSTRUCTION SETS

[75] Inventor: Michael P. Schmidt, Hollis, N.H.

[73] Assignee: Sanders Associates, Nashua, N.H.

[21] Appl. No.: 318,294

[22] Filed: Mar. 3, 1989

[51] Int. Cl.[5] ............................................. G06F 12/04
[52] U.S. Cl. ................................. 395/375; 364/254.9; 364/255; 364/DIG. 1
[58] Field of Search .............................. 364/200, 900

[56] References Cited

U.S. PATENT DOCUMENTS

| | | | |
|---|---|---|---|
| 3,317,898 | 5/1967 | Hellerman | 364/200 |
| 3,331,056 | 7/1967 | Lethin et al. | 364/200 |
| 3,412,382 | 11/1968 | Couleur et al. | 364/200 |
| 3,533,075 | 10/1970 | Johnson et al. | 364/200 |
| 3,614,746 | 10/1971 | Klinkhamer et al. | 364/200 |
| 3,675,215 | 7/1972 | Arnold et al. | 364/200 |
| 3,735,355 | 5/1973 | Balogh, Jr. et al. | 364/200 |
| 3,828,316 | 8/1974 | Card | 364/200 |
| 3,854,126 | 12/1974 | Gray et al. | 364/200 |
| 3,967,104 | 6/1976 | Brantingham | 364/900 |
| 4,079,451 | 3/1978 | Woods | 364/200 |
| 4,099,229 | 7/1978 | Kancler | 364/200 |
| 4,109,310 | 8/1978 | England et al. | 364/200 |
| 4,144,562 | 3/1979 | Cooper | 364/200 |
| 4,206,503 | 5/1980 | Woods et al. | 364/200 |
| 4,354,231 | 10/1982 | Carlsson | 364/200 |
| 4,370,709 | 1/1983 | Fosdick | 364/200 |
| 4,481,570 | 11/1984 | Wiker | 364/200 |

Primary Examiner—David Y. Eng
Attorney, Agent, or Firm—Cesari and McKenna

[57] ABSTRACT

A digital data processor executes fixed-length instructions containing either a direct literal or part of an address specifying an indirect literal stored in memory. The balance of the address of the indirect literal preferably is provided by the value of the program counter. A direct-indirect control bit contained in the instruction indicates whether a direct literal or indirect literal is specified by the literal field. In processing an instruction, the processor preferably treats the literal field contents as though it contained both direct literal bits and address bits for specifying an indirect literal. The processor uses the direct/indirect literal control bit to determine whether to pass the literal field contents or the fetched entry from the memory for further processing. In this way, the processor can obtain, for instance, either short direct literals or long indirect literals in an expeditious manner in the same number of cycles. Other embodiments of the invention provide processors for executing, in a novel manner, instructions each containing only a single indirectly-specified literal or two literals.

16 Claims, 5 Drawing Sheets

INDIRECT LITERAL EXPANSION FOR COMPUTER INSTRUCTION SETS

FIELD OF THE INVENTION

This invention pertains to pipelined processors in high-speed digital computers, and more particularly to an improved technique for coding, storing and processing literals, including large literals, using fixed-length-instruction sets.

BACKGROUND OF THE INVENTION

In a known form of digital data processing using a pipelined processor, a succession of instructions are processed simultaneously, each being executed in part at a succession of stages. Each instruction generally consists of an opcode or control field which specifies the operation to be carried out. Certain instructions also have literal fields.

A literal is a specific number, whether large or small, which is associated with an instruction and is used in performing the function directed by that instruction. A literal is a constant, in contra-distinction to a variable. It is used, for instance, to represent an index amount for an address calculation, a branch amount to be added to the program counter value, a shift amount for SHIFT AND ROTATE instructions, or floating point numbers in ADD FLOATING WITH IMMEDIATE DATA instructions.

Where a literal is contained in the instruction with which it is to be used, and is available immediately for use without further modification or processing, the literal is called an "immediate" or direct literal.

The size requirement, in bits, of a direct literal which must be accommodated in the literal field of the instruction varies greatly. For instance, a shift instruction might need a maximum of five bits to specify a shift amount while a floating point instruction might require a 32-bit value. In the past, instructions were formatted to have differing lengths to account for this bit-size difference. Accommodating such variations in instruction length, however, typically required more complicated processor design, and slower processing times due to the more complex control logic.

To avoid the disadvantages arising from processing variable-length instructions, solutions have been proposed for handling different length literals in a fixed-length-instruction format. These can be more readily described, and their shortcomings pointed out, with resort to an illustrative example, in which an instruction set is made up of fixed-length, 32-bit instructions that need to specify literals of five to 32 bits in length.

A first way to generate literals of such diverse lengths is to use two instructions, each containing, in addition to an opcode in its control field, part of the literal in its literal field—e.g., one that directs the loading of the upper 16-bits of the literal from its 16-bit literal field and the other that directs the loading of the lower 16-bits of the literal from its 16-bit literal field. A disadvantage with this approach is that, if the size of the literal is not known at compile time, then the compiler must assume that the number is a 32-bit value in order to be sure to compile the entire literal, regardless of whether it actually has a smaller bit value. Later, when the true length of the literal is known, most commonly at link time, the linker replaces the tag with the actual number. Unfortunately, in those cases in which the literals are of shorter lengths, e.g., five or six bits, such as typically would be the case for literals used in designating jumps between separately compiled code segments, the compiler need only have compiled the five or six bits instead of the 32-bits it actually compiled. Furthermore, the use of a second instruction to carry the literal was superfluous. Clearly, this approach is inefficient and wasteful of computer resources.

A second method of providing large literals, this time using a single fixed-length instruction, is to have the instruction specify an address in memory containing the literal. The literal is indirectly specified and, therefore, can be termed an "indirect literal." In other words, for indirect literals, the literal field contains a memory address and the desired literal is fetched, using that address, from a library of literals stored in memory. This permits the folding of literals in the library in order to save memory space, but is costly in terms of execution time.

Desirable is an efficient technique for providing both large and small literals using fixed-length instructions. Such a technique preferably would realize the advantages in execution time and overhead achieved by direct literals for expressing numbers having shorter bit-values, and also realize the greater capability and versatility achieved by indirect literals, particularly for expressing numbers of larger bit-values.

SUMMARY OF THE INVENTION

Accordingly, the invention aims at providing an improved pipelined data processor which can execute instructions containing direct literals or specifying indirect literals.

It is another object of the invention to provide an improved technique for coding, storing and processing efficiently literals of various lengths, using fixed-length instructions.

It is yet another object of the invention to reduce execution time penalty associated with known techniques for fetching indirect literals.

Other objects of the invention will in part be obvious and will in part appear elsewhere herein.

Briefly, a first embodiment of the invention provides for the use of both direct and indirect literals, e.g., depending on the length of the literal required for the instruction being executed. The instruction itself is of a novel format, containing, as it does, a control bit which determines whether the literal associated with the instruction is a direct or indirect literal. A pipelined data processor in accordance with the invention is adapted to execute such instructions, and use the control bit to determine the type of literal specified by the instruction.

This improved processor includes (1) an arrangement for obtaining the contents of the literal fields of fetched instructions being processed, (2) a memory for storing a plurality of indirect literals, (3) an arrangement for obtaining entries of the memory corresponding to fetched instructions each indicated by the value of the program counter and the contents of the literal field of the fetched instruction; and (4) a multiplexer responsive to the values of the control bits of the fetched instructions to pass, for each, either the contents of the instruction's literal field or the memory entry associated with the instruction. In other words, the multiplexer passes either a direct literal or an indirect literal for each instruction, depending on the value of the instruction's control bit. Thus, the literal field of each instruction contains either a direct literal or a portion of the address of an indirect literal stored in memory, the balance of the address preferably being the value of the program counter which is used to fetch the instruction itself.

The invention offers and employs many other advantageous features. In utilizing this improved approach, the processor can obtain an indirect literal while the instruction itself is being fetched and decoded. By treating the literal field contents thusly, as though it contained both direct literal and address bits specifying an indirect literal, and doing so in parallel, fixed length instructions with either short direct literals or long indirect literals can be executed in expeditious manner in the same number of cycles. Furthermore, memory space can be saved by folding the indirect literals stored in memory. Accordingly, this technique realizes improved versatility and flexibility in specifying both large and small literals.

In another embodiment, the invention provides for the accommodation of two literal fields in each literal-specifying instruction, each literal field containing either a direct or indirect literal, and each literal field associated with a direct/indirect literal control bit in the instruction for identifying the type of literal contained in the field. Where an indirect literal is specified, it is recovered from memory using the program counter value in addition to the value contained in the relevant literal field. In other words, the indirect literal is obtained in similar fashion to that described above in conjunction with the first embodiment.

Once obtained, each such literal can be used for any of a variety of purposes. For instance, the second literals can be stored as data in a data memory at corresponding addresses specified by the first literals. For this, the first literals can directly specify the addresses or can be used by the arithmetic logic unit to compute the addresses.

In yet another alternative embodiment, the invention is advantageously practiced in a processor which only accommodates indirect literals, one or more per instruction, and no direct literals. Here, as before, the indirect literals are fetched from an indirect literal memory, preferably, indirect literal caches. The memory locations containing each such literal are accessed using an address formed by the MSB's of the program counter, physical or virtual, and the contents of the literal fields of the associated instruction. As with the other embodiments, the literal can be fetched in the same machine cycle in which the instruction is decoded so as to minimize execution time penalty.

The invention accordingly comprises the features of construction, combination of elements, and arrangement of parts which are exemplified in the construction hereinafter set forth, and the scope of the invention will be indicated in the appended claims.

BRIEF DESCRIPTION OF THE DRAWINGS

For a fuller understanding of the features, advantages, and objects of the invention, reference should be made to the following detailed description and the accompanying drawings, in which.

DESCRIPTION OF THE PREFERRED EMBODIMENT

Figure 1:
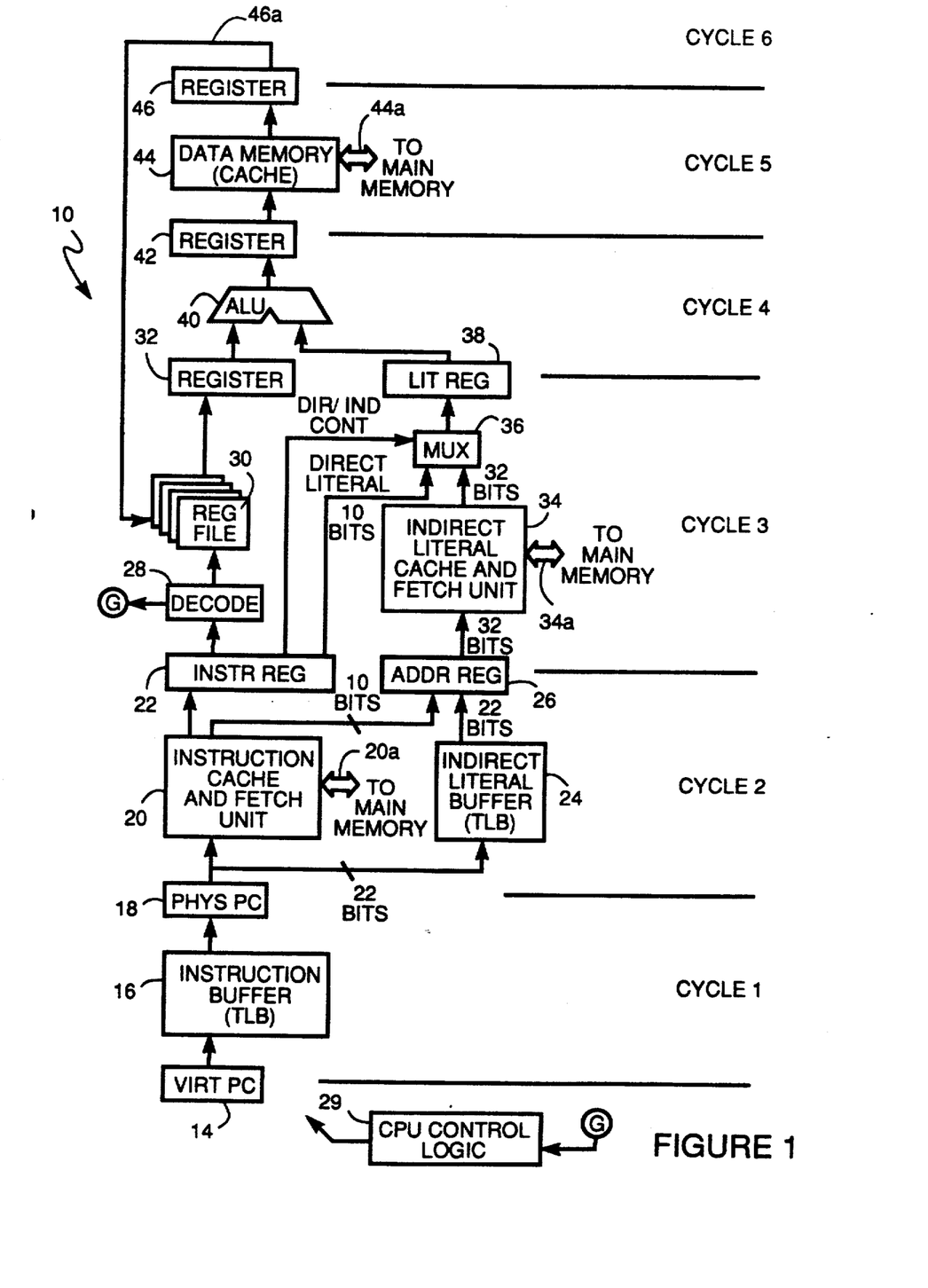
FIG. 1 is a diagrammatic view of a digital data processor in accordance with the invention.

Shown in the block diagram of FIG. 1 are physical pipeline stages of a digital data processor 10 in accordance with a first embodiment of the invention. The illustrated stages are denominated in accordance with the instruction execution cycles of the processor 10, with the processing steps of each being grouped and arranged in the drawing in accordance with their sequence and timing.

During the first instruction execution cycle, Cycle 1, a memory management function is performed by the processor 10. A virtual program counter 14 supplies virtual addresses to a translation look-aside buffer ("TLB") 16 which translates each virtual address into a physical address in accordance with a pre-determined algorithm, e.g., by replacing a portion of the virtual address with an entry from a table. For example, where the virtual and physical addresses have thirty-two bits each, the twenty-two most significant bits ("MSB's") of the virtual address are translated to a different value while the ten least significant bits ("LSB's") of the virtual address are passed through the instruction TLB 16 without change. The newly-determined physical address consisting of the concatenation of the translated MSB's and the LSB's is then stored in a physical program counter 18, where it resides at the end of Cycle 1.

During Cycle 2, the physical address stored in the register 18 is used to fetch an instruction from an instruction cache and fetch unit 20. The physical address is presented to the instruction cache 20 and the instruction stored therein at that address is fetched into an instruction register 22. If the instruction cache 20 does not contain an entry at that address, then conventional mechanisms are employed to obtain the instruction from main memory over bus 20a, and insert it in cache 20 for loading into instruction register 22.

Figure 2:
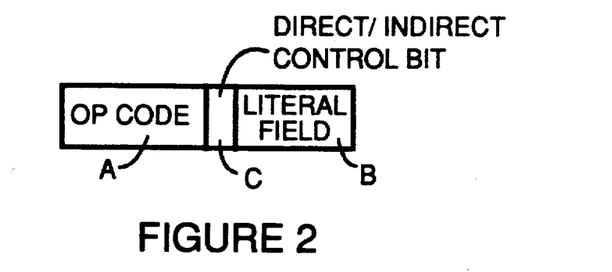
FIG. 2 is an illustration of an improved format for an instruction adapted for processing by the digital data processor of FIG. 1.

In accordance with the invention, the fetched instruction is of fixed length and has a novel format, as illustrated in FIG. 2. As shown there, the instruction contains an opcode or control field A for specifying arithmetic logic unit ("ALU") operations, register pointers, or the like, a literal field B and a direct/indirect control bit or flag C. For example, where the instruction is thirty-two bits in length, the control field A is the twenty-one most significant bits, the literal field B is the ten least significant bits, and the direct/indirect control bit C is the bit in-between the other fields, i.e., the eleventh bit of the instruction.

Also, in accordance with the invention, and depending for instance on the size of the literal, the literal field B contains either the literal value itself, i.e., a direct literal, or part of an address specifying memory storage locations containing the literal, i.e., an indirect literal, with the balance of the address of the indirect literal being obtained from the physical program counter (FIG. 1). The direct/indirect control bit has a value that indicates whether the literal field B contains the direct literal or the address information of a stored literal. For instance, where the direct/indirect control bit C is set to binary ONE, the literal field contains a direct literal; where it is cleared to binary ZERO, an indirect literal is specified by the literal field B.

Referring again to FIG. 1, during Cycle 2, in parallel with instruction fetching from the instruction cache 20, a plurality of the MSB's, e.g., the top 22-bits, of the physical address stored in the physical program counter 16 are provided to an indirect literal translation lookaside buffer ("TLB") 24. The indirect literal TLB 24 translates these in accordance with a pre-determined algorithm into a new physical upper 22-bits of the literal address, and provides these to a physical literal address register 26. At the same time, a plurality of the LSB's, e.g., the bottom 10-bits, of the physical address stored in the physical program counter 16, are provided to the physical literal address register 26 from the instruction cache 20. The MSB's from the literal TLB 24 and the LSB's from the instruction cache 20 are stored in the physical literal address register 26, and, when concatenated, form the physical literal address.

By the end of Cycle 2, the instruction fetched from cache 20 is stored in the instruction register 22 and the physical literal address resides in register 26.

In Cycle 3, a decoder 28 decodes the fetched instruction which it receives from the instruction register 22 to determine the nature of the fetched instruction, for example, whether it is an add, subtract, branch, load, or other type of instruction. The decoder 28 provides the decoded instruction to a CPU control logic unit 29. As is conventionally the case, the CPU control unit 29 uses information in the opcode of the instruction to determine whether the instruction includes a literal field. (If the instruction does not contain a literal field, the CPU control unit 29 causes the processor 10 to stop literal-related operations pertaining to that instruction.) Also, a register file 30 containing a plurality of registers R1, R2...RN (where n is a positive integer) is accessed to obtain the appropriate contents stored therein which are pointed to by the decoded instructions. For instance, where an instruction provides that a literal having a value of thirty three is to be added to the contents of a register nine, i.e., "R9+33", and the results are to be used as an address to access a memory entry, the contents of register nine are pulled out of the file 30 and passed to an operand register 32, where they reside at the end of Cycle 3.

Also in Cycle 3, and in parallel with instruction decoding, the physical literal address residing in register 26 is used to fetch a literal from an indirect literal cache and fetch unit 34 which is in communication with the main memory over bus 34a. Caching the literals permits faster recovery. The physical literal address is presented to the indirect literal cache and fetch unit 34, and the literal stored therein at that address is fetched and transferred to a first input of a multiplexer ("MUX") 36. At the same time, the instruction register 22 provides the contents of the literal field of the stored instruction to a second input of the MUX 36, and passes the value of the direct/indirect control bit C of the stored instruction to the control terminal of the MUX 36 to control which of the first or second inputs is passed by the MUX 36. In other words, the MUX 36 passes either the indirect literal fetched from the literal cache 34 using a literal address obtained from the literal field of the instruction, or the direct literal contained in the literal field itself, depending on the value of the direct/indirect control bit which serves as the MUX control signal. The passed literal is transferred into a literal register 38. In the example given above, R9+33, the value thirty-three would be contained in the literal register 38 at the end of the cycle, regardless of whether the literal was a direct literal received from the instruction register 22 or an indirect literal received from the indirect literal cache 34.

By the end of cycle 3, assuming that the literal is direct or was in the indirect literal cache 34, the processor 10 has available all information necessary to execute the instruction.

In Cycle 4, an arithmetic logic unit ("ALU") 40 performs conventional arithmetic operations, e.g., add, subtract, and pass operations, using the contents of the operand register 32 as a first input and the contents of the literal register 38 as a second input. Depending on control signals from the CPU control logic unit 29, which also controls all of the other operations of processor 10, the ALU 40 handles the literals received from the literal register in either of two ways. First, received literals are used on occasion as constants in the arithmetic operations performed by the ALU 40. (Returning to the running example, the contents of R9 are the first input and the constant thirty-three is the literal received as the second input and used as a summand to be added to the contents of the register nine. Second, the received literal at other times is not used by the ALU 40 in performing arithmetic operations, but rather is passed by the ALU 40 without being altered or modified so that, for example, it can be used in loading data into memory. The results of the operation of the ALU 40 are stored in a results register 42.

If a memory reference is to be performed, such as a load or store, it takes place in Cycle 5. The processor 10 is provided with a fast-acting data memory or cache 44 which is in communication with the main memory over bus 44a. For instance, continuing with the example given above, the data memory 44 is accessed using the computed results of the R9+33 operation as the address of the desired memory location therein from which an entry is to be fetched. The fetched entry is then stored in a data register 46 as the result, and is back-written over line 46a into the register file 30.

Figure 3:
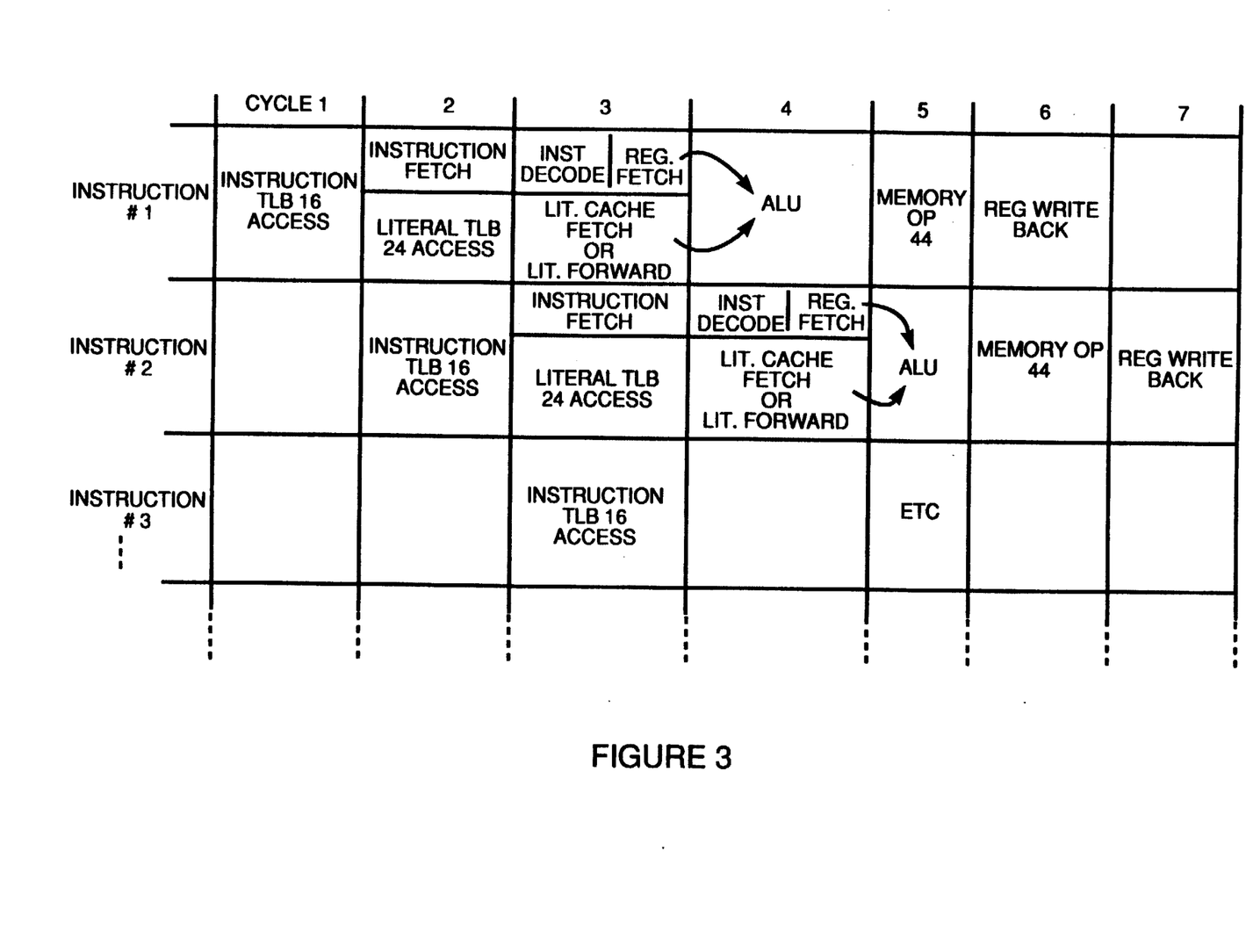
FIG. 3 is a flow chart depicting the processing of a plurality of instructions by the digital data processor of FIG. 1.

As adverted to above, processor 10 is a pipelined processor in which each of a succession of instructions are processed in part simultaneously. FIG. 3 illustrates this by depicting the processing of a plurality of instructions identified as Instruction #1, Instruction #2 and so on, during the various stages described hereinabove. For instance, Instruction #1 is processed as follows:

| | |
|---|---|
| in Cycle 1: | INSTRUCTION TLB 16 ACCESS; |
| in Cycle 2: | simultaneous execution of INSTRUCTION FETCH with LITERAL TLB 34 ACCESS; |
| in Cycle 3: | simultaneous execution of INSTRUCTION DECODE and REGISTER FETCH with LITERAL CACHE 34 FETCH or LITERAL FORWARD; |
| in Cycle 4: | ALU 40 OPERATION; |
| in Cycle 5: | MEMORY 44 OPERATION; |
| in Cycle 6: | REGISTER WRITE-BACK |

Simultaneous with, though one cycle delayed with respect to, the execution of Instruction #1 is the execution of Instruction #2. Thus, for example, the INSTRUCTION TLB ACCESS for Instruction #2 occurs in Cycle 2, at the same time as INSTRUCTION FETCH and LITERAL TLB ACCESS for instruction #1, etc The REGISTER WRITE BACK for Instruction #2 is performed in Cycle 7, one cycle after the complete execution of Instruction #1. Analogously, Instruction #3, is executed in stepped-through fashion, one cycle delayed with respect to Instruction #2, and so forth.

It can thus be seen that the above-described embodiment of the invention provides an improved technique for coding, storing and processing literals, including large literals, using fixed-length instructions each containing either a literal value or part of the address of a stored literal, preferably with the program counter providing the balance of the address. The address bits provided by the program counter for this purpose can be virtual address bits though preferably are physical address bits of the instruction to be fetched. When the direct/indirect control bit is a ONE, for example, the contents of the literal field is used as the literal value; when the direct/indirect control bit is a ZERO, an address is formed, for example, by the upper 22-bits of the program counter concatenated with the 10-bits of the literal field of the instruction. This address, which can be called the Virtual Literal Address or VLA, is translated to a physical address via a memory management translator scheme which is analogous to the translation of conventional virtual instruction and data spaces to physical addresses. Subsequently, the indirect literal is fetched from memory locations identified by this physical address.

This embodiment of the invention offers and employs many other advantageous features. In utilizing this improved approach, the processor 10 endeavors to obtain an indirect literal while the instruction itself is being fetched and decoded. By treating the literal field contents thusly as though it contained both direct literal bits and address bits specifying an indirect literal, and doing so in parallel, fixed length (e.g., 32-bit) instructions with either short direct literals or long indirect literals can be executed in expeditious manner in the same number of cycles. In other words, and referring again to FIG. 3, while conventional processors equipped to handle indirect literals typically do not obtain such literals prior to the first ALU operation after instruction decode and so must await the next ALU operation to be executed, thereby requiring a larger number of cycles for complete execution, the processor 10 makes the literal, whether directly or indirectly specified, available after the third cycle and in time for the next ALU operation, e.g., on the very next cycle after instruction decoding.

Furthermore, memory space can be saved by folding the indirect literals stored in the memory cache 34. This savings can be realized because many indirect literals are used repeatedly although they need to be stored in memory only once. Accordingly, memory management can be set up to map a plurality of virtual literal addresses to the same physical address of these common literals.

Yet another advantage of the invention stems from the permitted use of instructions having the same length regardless of whether they contain a direct or indirect literal. This means that the direct/indirect control bits can be changed to obtain literals of shorter or longer length, without affecting the length of code or offsets. Taking, for example, an instruction specifying a jump between separately compiled modules, one can readily see that the branch amount can be specified by either a direct literal, or an indirect literal with minimal or no time penalty. For instance, a particular processor may be able to support 10-bit and 16 bit literals for branching and other address and data related operations. If the size of the literal is such that it falls outside of the range of plus or minus 512 bits or outside the range of plus or minus 32 K bits, respectively, then the contents of the literal field point to a literal stored in memory and need not itself be a literal. On the other hand, for literals within the respective ranges, the instruction's literal field can provide a direct literal. This flexibility is not offered by the conventional methods of providing literals, which were discussed above.

Yet another advantage of the invention is versatility. Pipelined processors vary considerably in their construction and operation, particularly in their down stream stages, depending on whether they contain data cache, on the depth of the ALU, on the number and type of functions performed by the ALU and on other factors. For instance, an ALU that can perform division may require thirty cycles in order to calculate a quotient. Nevertheless, the invention can be implemented readily by those skilled in the art in a broad range of processor configurations, since the first three cycles pertaining to instruction fetch and decode and obtaining the literal typically can be implemented in analogous manner to those depicted in FIG. 1 even if the remaining stages of a particular processor differ substantially.

ALTERNATIVE EMBODIMENTS

Figure 4:
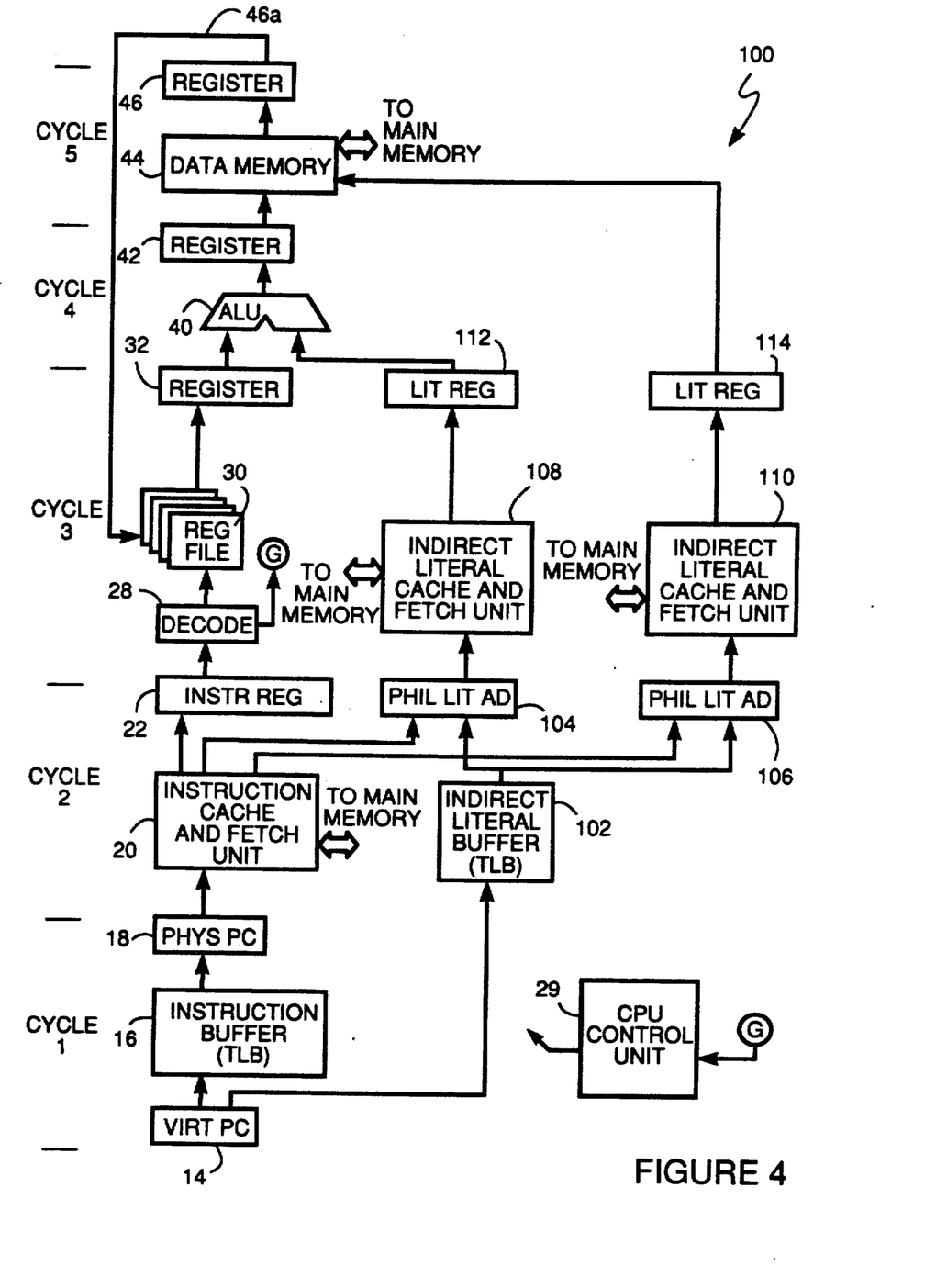
FIG. 4 is a diagrammatic view of an alternative embodiment of a digital data processor in accordance with the invention.

FIG. 4 shows an alternative way of implementing the invention. In the digital data processor there shown, designated generally as 100, many of the components are the same as discussed above. For convenience, these components bear the same reference numbers. However, processor 100 differs from the earlier-described processor 10 of FIG. 1 in three significant ways.

First, the top 22-bits of the value of the virtual program counter 14 are fed into an indirect literal TLB 102 which translates these bits into a new physical upper 22-bits of the literal address. In processor 10, it will be recalled, it was a portion of the physical program counter value that was used for this purpose.

The second difference between the two illustrated embodiments has to do with the format of the instructions that the processor 100 executes. The processor 100 is designed to execute instructions having either one or two literal fields, and not just a single literal field as was earlier the case.

Figure 5:
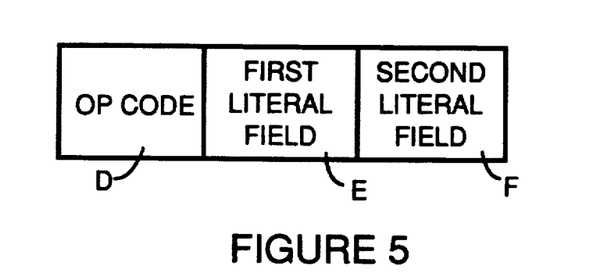
FIG. 5 is an illustration of an improved format for an instruction adapted for processing by the digital data processor of FIG. 4.

A suitable format for the instruction for processor 100 is illustrated in FIG. 5. As there shown, the instruction again is of a fixed 32-bit length. The opcode or control field D is formed from the ten most significant bits, while first and second literal fields E, F, each of twelve bits, are formed from the remaining bits, the LSB's. The opcode field D, in addition to the functions it conventionally serves, contains an indication of whether one or more literals are specified in the instruction. This information is used by the CPU control unit 29 in controlling the operation of the processor 100 in accordance therewith.

In order to execute such instructions, the output from the indirect literal TLB 102 branches so as to provide the 22-bit MSB's of the physical literal address to both a first and second physical literal address register 104, 106. The LSB's of the physical literal address are provided, as before, from the instruction cache and fetch unit 20. This time, however, the contents of literal field E are supplied to physical literal address register 104, and the contents of literal field F are supplied to physical literal address register 106. The addresses contained in these registers 104, 106 are used to recover indirect literals stored in respective first and second indirect literal cache and fetch units 108, 110.

Cache and fetch units 108, 110 are shown as separate blocks, though they can be implemented in a single cache if so desired. By the same token, those skilled in the art will appreciate that all separately illustrated memories and caches shown in FIGS. 1 and 4 can be implemented as parts of a single memory.

The final difference between the processors 10 and 100 of FIGS. 1 and 4, respectively, is that the processor 100 is equipped to handle only indirect literals, while processor 10 accommodates both direct and indirect literals. Because of this difference, processor 100 does not require either a multiplexer or control bits in the instruction. The entries recovered from the indirect literal cache and fetch units 108, 110 are the indirect literals, and these are passed to respective first and second literal registers 112, 114. For each instruction, the indirect literal stored in first literal register 112 is transferred to the ALU 40 where it is used as described above with respect to processor 10. The indirect literal stored in second literal register 114, on the other hand, is transferred for storage as data in the data memory 44.

Processor 100 is particularly well suited for executing commands which entail the storing of a number at a specified address in the data memory 44. For instance, the number to be stored is specified indirectly by the second literal field F of FIG. 5 and the program counter value MSB's and thereby is obtainable from the second indirect literal cache and fetch unit 110. The address at which the number is to be stored either is specified indirectly by the first literal field E of FIG. 5 and the program counter value MSB's, and thereby is obtainable from the first indirect literal cache and fetch unit 108, or is calculated by the ALU 40 using the indirect literal from cache 108 as an input thereto.

For example, an instruction "WRITE 3800 TO LOCATION 35" would contain specific contents in its first literal field E which are used in combination with the translated virtual program counter value MSB's to obtain the indirect literal "thirty five" from the indirect literal cache and fetch unit 108. Alternatively, the entry so obtained from the indirect literal cache and fetch unit 108 can be used by the ALU in computing the address "thirty five". Meanwhile, the data "3800" is obtained using the contents of the second literal field F in combination with the same translated program counter value MSB's an address into the second indirect literal cache and fetch unit 110 so as to recover the number "3800" therefrom.

Importantly, processor 100 obtains the two indirect literals simultaneously, by paralleling the process by which they are obtained, so that the first and second literal registers 112, 114 are loaded with their respective indirect literals during the same machine cycle. The associated instruction is being decoded also during that same cycle.

As also will be appreciated, the invention can be practiced advantageously in other types of processors as well. For instance, and referring now to FIG. 6, a processor 200 combines the direct/indirect literal capability of processor 10 of FIG. 1 with the multiple indirect literal capability of processor 100 of FIG. 4. This would require, for instance, a plurality of branches 202, 204 for fetching the indirect literals, the branches being analogous to those shown in FIG. 4 in that they each contain a physical literal address register 206, 208, indirect literal cache and fetch unit 210, 212, and literal register 214, 216, but different in that they further contain a multiplexer 218, 220 connected between the indirect literal cache and fetch unit 210, 212 and the literal register 214, 216 for receiving the literal field contents and appropriate direct/indirect literal control bit from the instruction register 22 and, responsive to the value of that control-bit, for passing either a direct or indirect literal, all as described in conjunction with FIG. 1.

Figure 6:
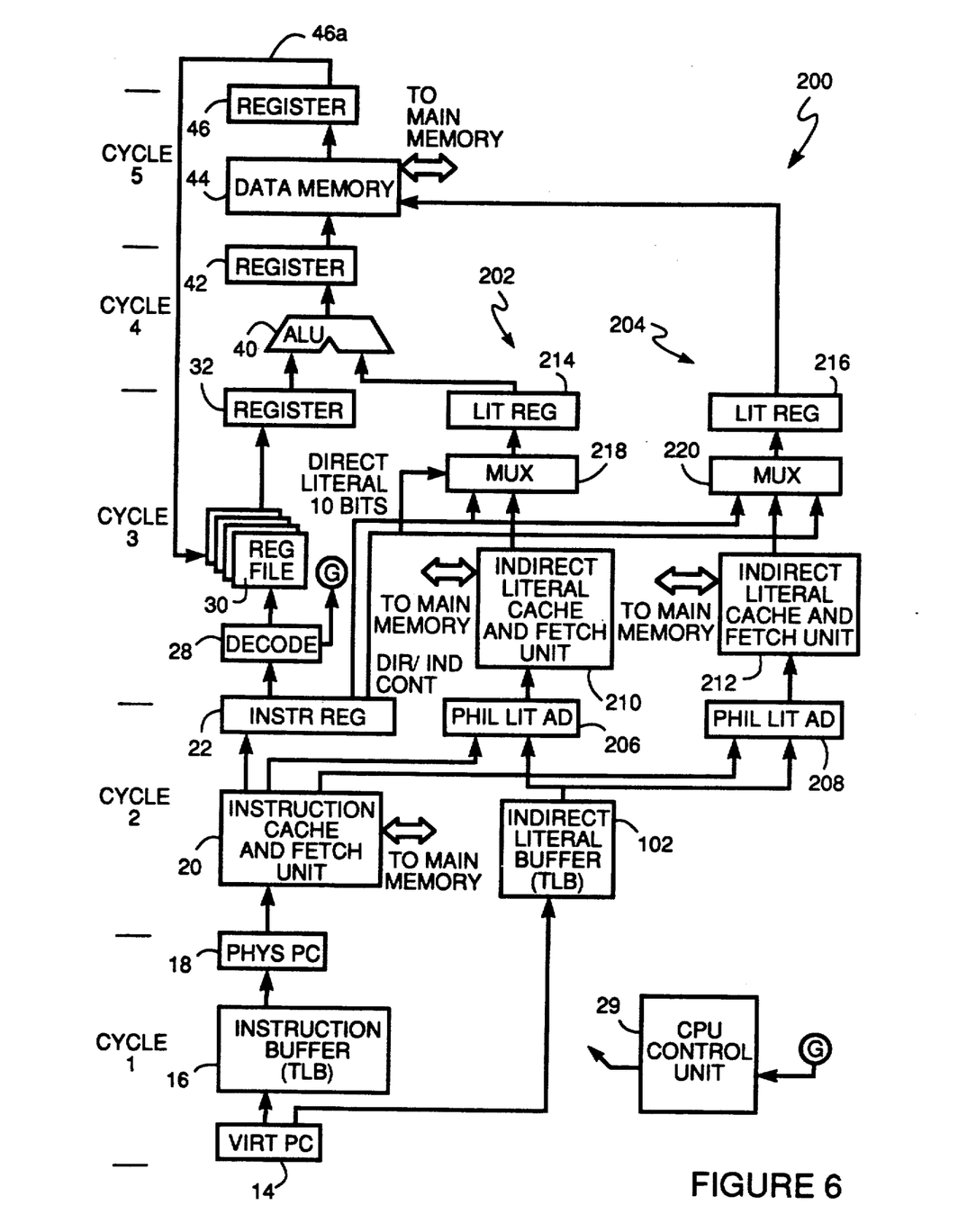
FIG. 6 is a diagrammatic view of yet another embodiment of a digital data processor in accordance with the invention.
Figure 7:
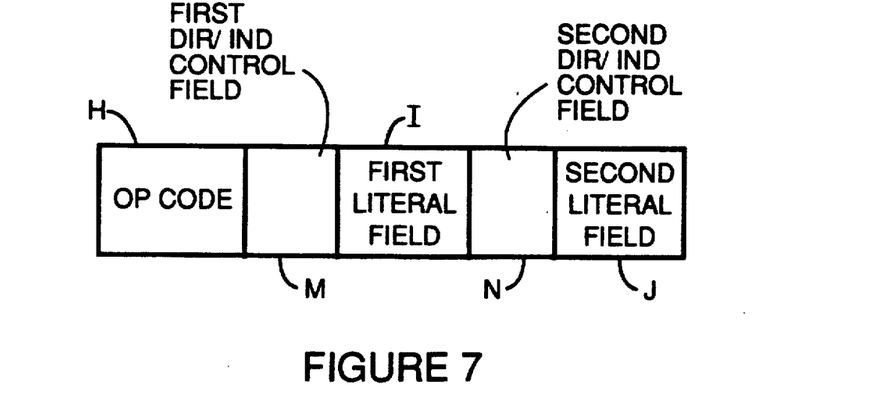
FIG. 7 is an illustration of an improved format for an instruction adapted for processing by the digital data processor of FIG. 6.

For this processor 200, a suitable 32-bit instruction format is shown in FIG. 7. The first ten bits are the control field H, which, in addition to the functions it normally serves, indicates to the CPU control unit 29 (FIG. 6) whether the instruction contains one or two literals. It also contains first and second literal fields I, J which are each of ten bits in length and are associated with respective single-bit direct/indirect control fields M,N of the instruction. The first literal field I and control bit M are processed in branch 202 (FIG. 6) while the literal field J and control bit N are processed in branch 204 (FIG. 6).

Of course, a simpler processor which accommodates only a single indirect literal (and no direct literals) can also be practiced in accordance with the invention so as to obtain efficient fetching of indirect literals while the associated instruction is being decoded. As with the other described processors 10, 100, and 200, by using the program counter value in recovering the indirect literal from cache, such a processor achieves a reduced time penalty compared to known arrangements for fetching indirect literals.

It will thus be seen that the objects set forth hereinabove, among those made apparent from the preceding description, are efficiently attained and, since certain changes may be made in the above-described construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and those made obvious herefrom.

What is intended to be covered by Letters Patent and what is claimed is:

1. A digital data processor for executing a plurality of fixed-length instructions, a sub-plurality of which being of the type having a control field and a literal field, said digital data processor including a memory for storing instructions, a program counter for indicating memory addresses of instructions to be fetched, a decoder for decoding instructions fetched from said memory, and an arithmetic processing unit for performing operations in accordance with said decoded fetched instructions, said digital data processor further comprising:
 A. direct-literal-obtaining means for obtaining the contents of said literal fields of said fetched instructions, said contents including direct literals or partial addresses of indirect literals;
 B. indirect-literal memory means for storing a plurality of entries including indirect literals;

C. indirect-literal-obtaining means for obtaining the entries from the indirect literal memory means which correspond to the fetched instructions; and D. literal-passing means coupled with the direct-literal and indirect-literal-obtaining means, and responsive to control signals for passing, in association with each of said fetched instructions, one of said entries from said indirect literal memory means and said contents of said literal field of said fetched instruction, whichever contains the literal associated with said fetched instruction, whereby passed contents represents a direct literal and a passed entry represents an indirect literal.

2. The digital data processor of claim 1 wherein said control signals comprise direct/indirect control fields of said fetched instructions, the value of each said field indicating whether said literal passing means is to pass the direct or indirect literal.

3. A digital data processor for executing a plurality of fixed length instructions of the type having a control field and a literal field, said processor comprising:

A. first memory means having a plurality of fields for storing a plurality of said instructions;

B. second memory means having a plurality of fields for storing a plurality of literals;

C. address means for providing an address having a first and second plurality of bits;

D. instruction means responsive to said address from said address means for fetching the instruction stored in the one of said second memory fields which is associated with said address, and for decoding said fetched instruction;

E. indirect literal means responsive to said address from said address means and to said instruction fetched by said instruction means for fetching the contents of the one of said second memory fields associated with said first plurality of bits of said address and associated with the contents of said literal field of said instruction;

F. an arithmetic logic unit; and

G. means responsive to a control flag in said instruction for passing the contents of said literal field of said instruction from said instruction means into said arithmetic logic unit whenever said control flag has a first value, said passed literal field contents being a direct literal, and for passing contents of said one second memory field fetched by said indirect literal means to said arithmetic logic unit whenever said control flag has a second value, said passed memory field contents being an indirect literal, whereby said processor accepts both direct and indirect literals.

4. The digital data processor of claim 3 wherein
(a) said address means includes
    (1) a virtual program counter,
    (2) a translation look-aside buffer in communication with said program counter for translating a virtual address stored therein into said physical address, and
    (3) a physical address register for storing said physical address; and
(b) said instructions means includes
    (1) an instruction register in communication with said first memory for storing said fetched instruction; and
    (2) a decoder in communication with said instruction register for decoding said fetched instruction.

5. The digital data processor of claim 4 wherein said indirect literal means includes means in communication with said physical address register and said first memory for forming a literal address from said first plurality of bits of said physical address and from the contents of said literal field of said fetched instruction and for storing said literal address.

6. The digital data processor of claim 5 wherein said indirect literal means includes
(a) a literal register for storing a literal;
(b) a multiplexer connected to said second memory for receiving said contents of said one of said second memory field as a first input and connected to said instruction register for receiving said contents of said literal field of said instruction as a second input and said control flag a control signal, and, in response to the value of said control flag, for passing one of said first and second inputs to said literal register as a literal to be stored therein.

7. The digital data processor in accordance with claim 6 wherein the literal is passed to said literal register in the same execution cycle as the fetched instruction is decoded.

8. The digital data processor of claim 4 wherein said indirect literal means includes means in communication with said virtual address register and said first memory for forming a literal address from said first plurality of bits of said virtual address and from the contents of said literal field of said fetched instruction and for storing said literal address.

9. A digital data processor for executing a plurality of fixed length instructions of the type having a control field and a literal field, said processor comprising:

A. first memory means having a plurality of fields for storing a plurality of said instructions;

B. second memory means having a plurality of fields for storing a plurality of literals;

C. address means for providing an address having a first and second plurality of bits;

D. instruction means responsive to said address from said address means for fetching the instruction stored in the one of said second memory fields which is associated with said address, and for decoding said fetched instruction;

E. indirect literal means responsive to said address from said address means and to said instruction fetched by said instruction means for fetching the contents of the one of said second memory fields associated with said first plurality of bits of said address and associated with the contents of said literal field of said instruction;

F. an arithmetic processing unit in communication with said instruction means and said indirect literal means; and G. wherein, for each instruction of said sub-plurality of instructions, said fetched contents represent an indirectly-specified literal.

10. A digital data processor for executing a plurality of fixed length instructions of the type having a control field and first and second literal fields, said processor comprising:

A. first memory means having a plurality of fields for ·storing a plurality of the instructions;

B. second memory means having a plurality of fields for storing a plurality of literals;

C. address means for providing an address having a first and second plurality of bits;

D. instruction means in communication with said address from said address means for fetching the instruction stored in the one of said second memory fields which is associated with said address, and for decoding said fetched instruction;

E. first indirect literal means in communication with said address from said address means and said instruction means for fetching the contents of the one of said second memory fields associated with said first plurality of bits of said address and associated with the contents of said first literal field of said instruction, said fetched contents being a first literal; and F. second indirect literal means in communication with said address means and said instruction means for fetching the contents of the one of said second memory fields associated with said first plurality of bits of said address and associated with the contents of said second literal field of said instruction, said fetched contents being a second literal.

11. The digital data processor of claim 10, further comprising:
   A. an arithmetic logic unit for receiving the first literal from said first indirect literal means and for carrying out the instruction associated with that literal; and
   B. data memory means for receiving said second literal from said second indirect literal means and for storing said second literal.

12. The digital data processor of claim 11 wherein said second literal is stored in locations in said data memory means specified by said first literal.

13. The digital data processor of claim 11 wherein said arithmetic logic unit uses said first literal in computing an address at which said second literal is to be stored in said data memory.

14. A digital data processor for executing a plurality of fixed-length instructions of the type having a control field and a literal field, said digital data processor including a memory for storing instructions, a program counter for indicating memory addresses of instructions to be fetched, a decoder for decoding instructions fetched from said memory, and an arithmetic processing unit for performing operations in accordance with said fetched instructions, said digital data processor further comprising:
   A. indirect literal memory means for storing a plurality of entries including indirect literals; and
   B. indirect-literal-obtaining means for obtaining the entry from the indirect literal memory means which corresponds to one of the fetched instructions, said indirect-literal-obtaining means
      i. being connected to the program counter to receive a value therefrom which corresponds to the fetched instruction,
      ii. being connected to the instruction memory for receiving the contents of the literal field of the fetched instruction,
      iii. using the received value and received contents in obtaining the entry in the memory means that corresponds to the fetched instruction.

15. A digital data processor for executing a plurality of fixed-length instructions of the type having a control field and first and second literal fields, said digital data processor including a memory for storing instructions, a program counter for indicating memory addresses of instructions to be fetched, a decoder for decoding instructions fetched from said memory, and an arithmetic processing unit for performing operations in accordance with decoded fetched instructions, said digital data processor further comprising:
   A. indirect literal memory means for storing a plurality of entries including indirect literals;
   B. first indirect-literal-obtaining means for obtaining a first entry from said indirect literal memory means which corresponds to one of the fetched instructions, said first indirect-literal-obtaining means
      i. being connected to the program counter to receive a value therefrom which corresponds to the fetched instruction,
      ii. being connected to the instruction memory for receiving the contents of the first literal field of the fetched instruction,
      iii. using the received value and received contents in obtaining one of the entries in the memory means that corresponds to the fetched instruction, said entry representing a first literal; and
   C. second indirect-literal-obtaining means for obtaining a second entry from said indirect literal memory means which corresponds to the fetched instruction, said indirect-literal-obtaining means
      i. being connected to the program counter to receive a value therefrom which corresponds to the fetched instruction,
      ii. being connected to the instruction memory for receiving the contents of the second literal field of the fetched instruction,
      iii. using the received value and received contents in obtaining another of the entries in the memory means that corresponds to the fetched instruction, said entry representing a second literal.

16. A digital data processor for executing a plurality of fixed-length instructions of the type having a control field and first and second literal fields, said digital data processor including a memory for storing the instructions, a program counter for indicating memory addresses of instructions to be fetched, a decoder for decoding instructions fetched from said memory, and an arithmetic processing unit for performing operations in accordance with said decoded fetched instructions, said digital data processor further comprising:
   A. first direct-literal-obtaining means for obtaining the contents of said first literal fields of said fetched instructions, said contents including direct literals;
   B. indirect-literal memory means for storing a plurality of entries including indirect literals;
   C. first indirect-literal-obtaining means for obtaining the entries from the indirect literal memory means which correspond to the fetched instructions;
   D. first literal-passing means coupled with said first direct-literal and first indirect-literal-obtaining means, and responsive to control signals for passing, in association with each of said fetched instructions, one of said entries from said indirect literal memory means and said contents of said first literal field of said fetched instruction, whichever contains a first literal associated with said fetched instruction, whereby passed contents represents a direct literal and a passed entry represents an indirect literal;
   E. second direct-literal-obtaining means for obtaining the contents of said second literal fields of said fetched instructions, said contents including direct literals;

F. second indirect-literal-obtaining means for obtaining the entries from the indirect literal memory means which correspond to the fetched instructions; and G. second literal-passing means coupled with said second direct-literal- and second indirect-literal-obtaining means, and responsive to control signals for passing, in association with each of said fetched instructions, one of said entries from said indirect literal memory means and said contents of said literal field of said fetched instruction, whichever contains a second literal associated with said fetched instruction, whereby passed contents represents a direct literal and a passed entry represents an indirect literal.

* * * * *